Figure 1:
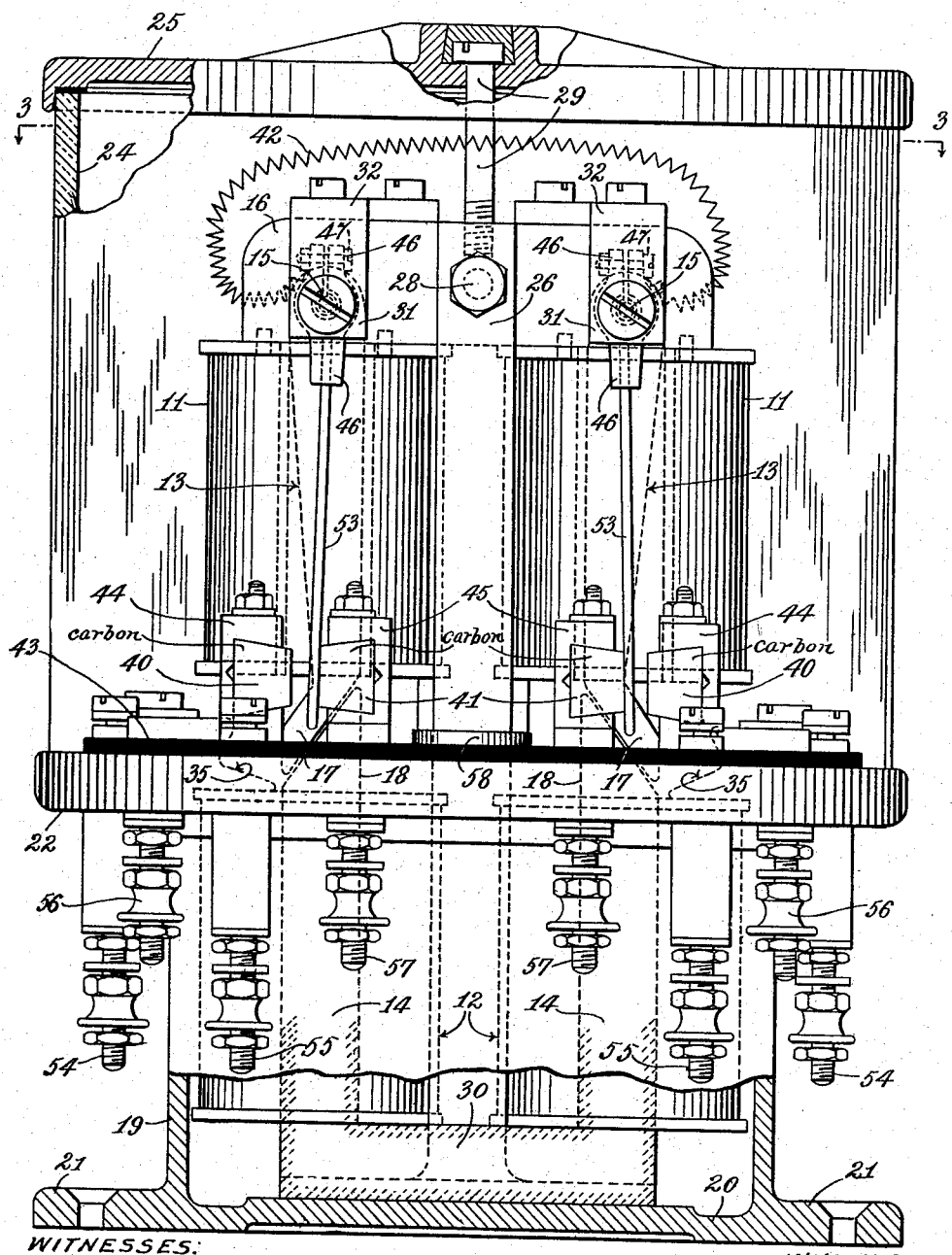

R. W. TARRANT.
ELECTRIC RELAY.
APPLICATION FILED JUNE 3, 1914.

1,168,438.

Patented Jan. 18, 1916.
4 SHEETS—SHEET 1.

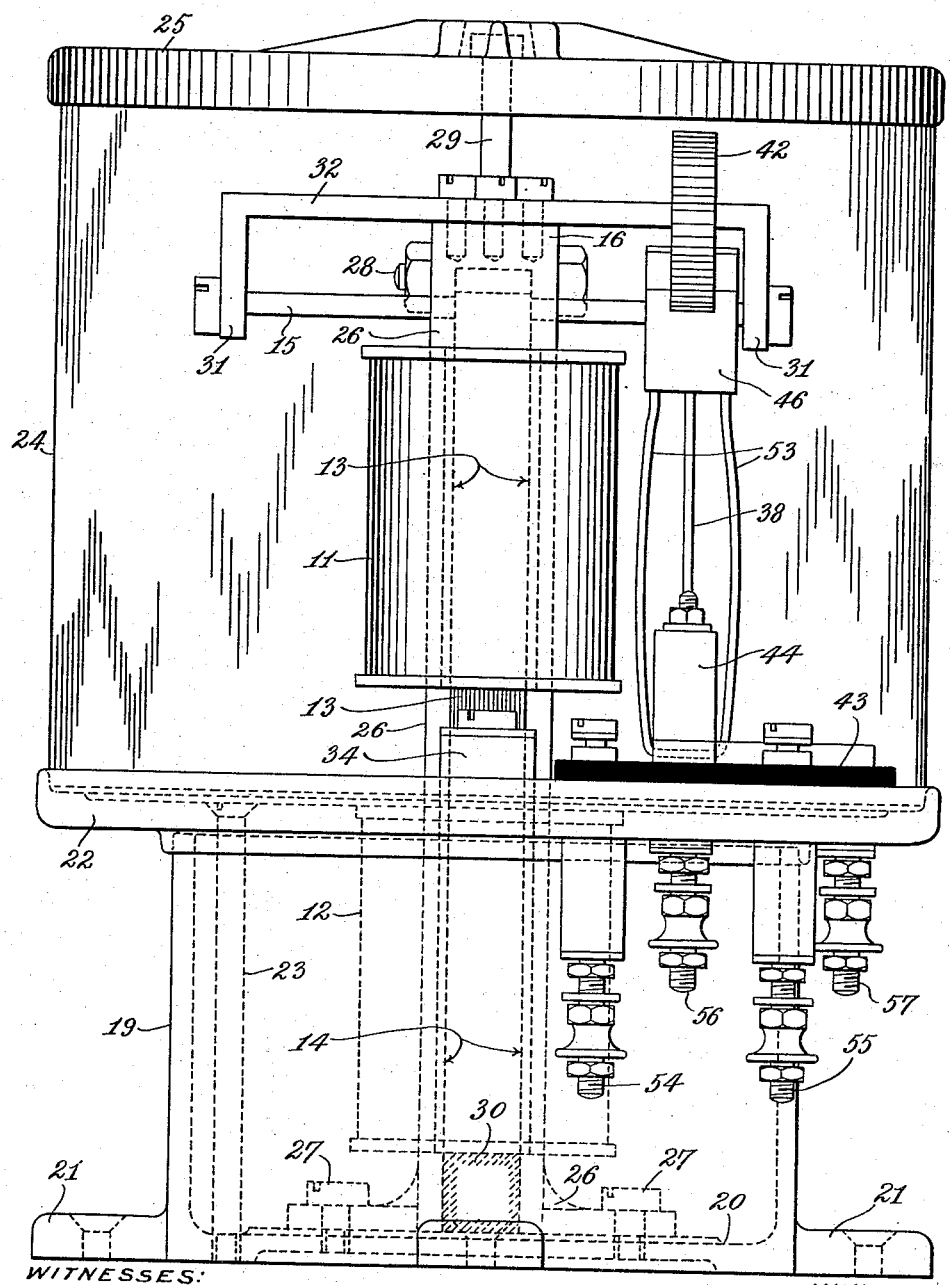

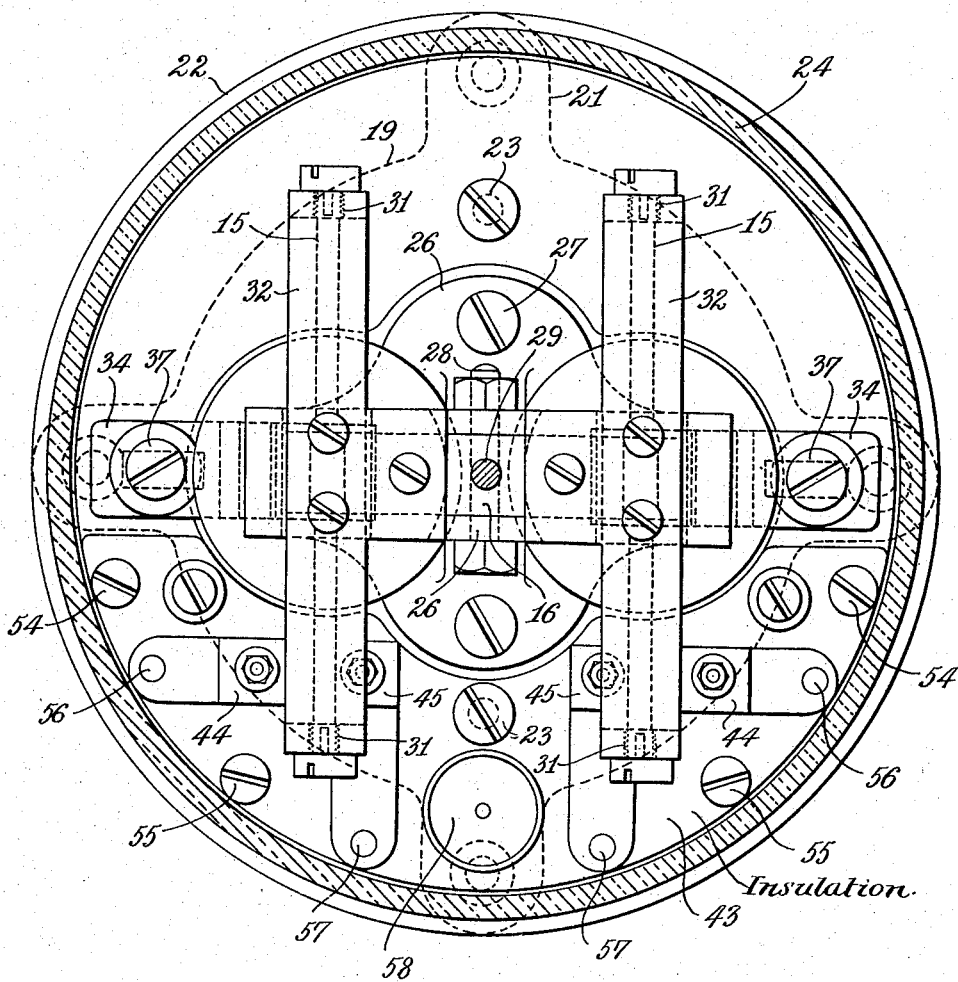

R. W. TARRANT.
ELECTRIC RELAY.
APPLICATION FILED JUNE 3, 1914.
1,168,438.
Patented Jan. 18, 1916.
4 SHEETS—SHEET 4.
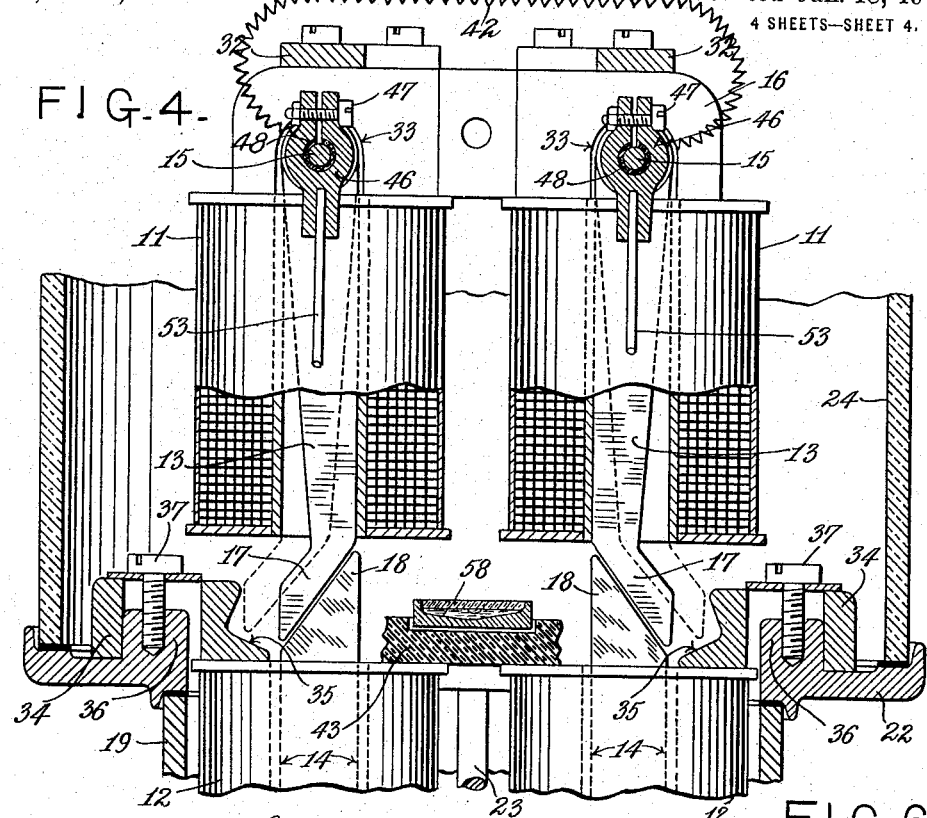
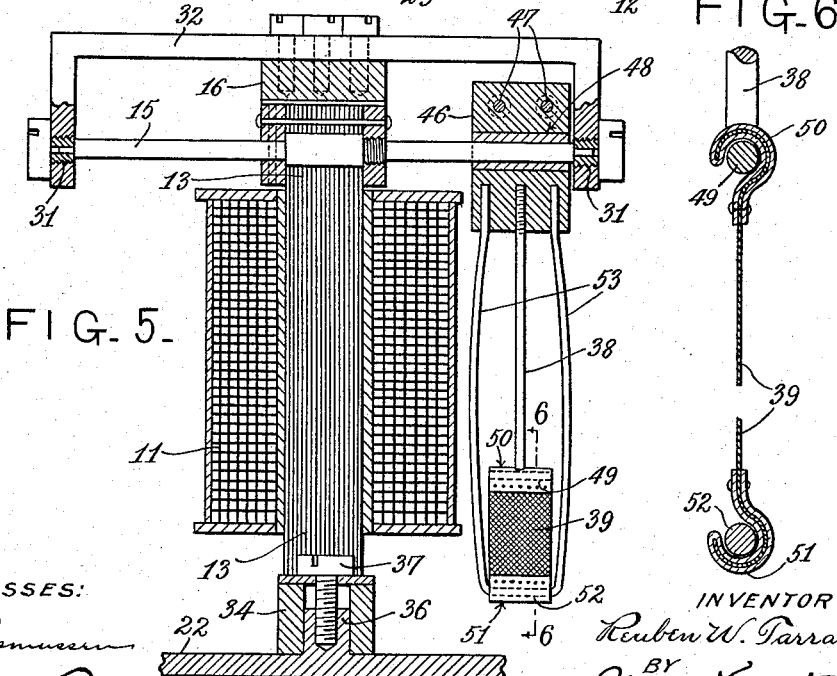
WITNESSES:
INVENTOR
Reuben W. Tarrant
BY
ATTORNEYS.

UNITED STATES PATENT OFFICE.

REUBEN WILLIAM TARRANT, OF CLAPHAM, LONDON, ENGLAND.

ELECTRIC RELAY.

1,168,438. Specification of Letters Patent. Patented Jan. 18, 1916.

Application filed June 3, 1914. Serial No. 842,557.

*To all whom it may concern:*

Be it known that I, REUBEN WILLIAM TARRANT, a subject of the King of Great Britain, and resident of 26 Voltaire road, Clapham, London, S. W., England, electrical engineer, have invented a certain new and useful Improved Electric Relay, of which the following is a specification.

This invention relates to improvements in electric relays of the kind comprising two electromagnets, whereof one may for convenience be termed the field-electromagnet, and the other the armature-electromagnet, inasmuch as its core constitutes, in effect, an armature for the field-electromagnet, said armature being so mounted as to tend to assume a position whence it is displaced by the influence of the magnetic flux only when the magnetic fields produced by the respective electromagnets are in syntony, while the movement of said armature is utilized for the purpose of governing a switch controlled by the relay.

In the improved relay of the present invention, which is designed more particularly for use with alternating current, the pole-pieces of the armature-electromagnet are separately pivoted and independently movable relatively to the respective pole-pieces of the field-electromagnet and serve to govern or actuate separate electric switches both of which may be interposed in the controlled circuit which is thus, by the action of the relay, closed or opened (as the case may be) at two independent points; the arrangement being such that the movable pole-pieces are caused to recede, and to remain apart, from the respective pole-pieces of the field-electromagnet so long only as the magnetic fields produced by the respective electromagnets are in syntony.

In the accompanying drawings, which illustrate a convenient construction embodying the invention, Figure 1 is a side elevation of the improved relay viewed in a direction at right angles to the plane of oscillation of the movable cores. Fig. 2 is an elevation viewed in the direction of said plane of oscillation. Fig. 3 is a plan view, in section on line 3—3 of Fig. 1. Fig. 4 is a part elevation looking in the same direction as Fig. 1, some portions being shown in section. Fig. 5 is a part elevation of the upper portion of the apparatus, looking in the same direction as Fig. 2, some portions being shown in section. Fig. 6 is a section on the line 6—6 of Fig. 5, drawn to a larger scale.

It will be seen from the drawings that the two electromagnets comprised in the relay are each of substantially U-shape, and are placed one directly above the other, that electromagnet which has movable cores being uppermost so as to present the appearance of an inverted U while the other electromagnet, which has stationary cores, presents the appearance of an upright U.

Referring to the drawings, 11 are the windings of that (upper) electromagnet which having movable cores, will be referred to hereinafter as the armature electromagnet, and 12 are the windings of that (lower) electromagnet which having stationary cores will be referred to hereinafter as the field electromagnet, 13 being the movable cores of the former and 14 the stationary cores of the latter. The axes of all the windings 11 and 12 extend vertically in one plane wherein also the movable cores 13 are respectively adapted to oscillate, relatively to their stationary yoke 16, about axes 15 as hereinafter described. The stationary cores 14 present their beveled pole-pieces 18 upward and outward, and the movable cores 13, which present their oblique or beveled pole-pieces 17 downward and inward, depend from their axes of oscillation 15 so as to tend under gravity to assume a position wherein the beveled faces of their pole-pieces 17 approach closely to the correspondingly beveled faces of the stationary pole-pieces 18. Each pole-piece 17 overlaps the adjacent pole-piece 18 so that, on either couple of axially-alined windings 11 and 12 being concurrently energized in such manner that their pole-pieces 17 and 18 have the same polarity, the movable pole-piece 17 will be magnetically repelled from the stationary pole-piece 18 and will cause the core 13 to move in the corresponding direction about its axis of suspension 15 so as to take up the position indicated in dotted lines in Fig. 4, this movement (in the construction illustrated) taking place in opposite directions in the case of the respective cores 13.

It will be evident that, if the respective electromagnets be concurrently energized by alternating currents of the same frequency and phase, each couple of adjacent pole-pieces 17, 18 will be alternately both of N and both of S polarity, with the result that, assuming the current-alternations to succeed one another at intervals too short to permit of the magnetically-repelled cores 13 returning under gravity, during each such interval, from the position wherein their pole-pieces 17 are at their maximum permissible distance from the corresponding pole-pieces 18, the respective movable cores 13 will continue to be held apart magnetically in the positions indicated in dotted lines in Fig. 4. In practice a current-frequency sufficient to insure this result would be employed. On any disturbance occurring in the current-conditions, one or both of the movable cores 13 will fall back under gravity, whether such disturbance be due (say) to one or both of the electromagnets ceasing to be energized, or to one of the electromagnets becoming energized by current of a frequency or phase different from that of the current whereby the other electromagnet is energized, or to continuous direct current of sufficient strength gaining access to the windings of one or other of the electromagnets.

The working parts of the improved relay are inclosed within an upright cylindrical casing which is formed in two stories for the sake of convenience. The lower story or base (see Fig. 2) consists of an upright metal cylinder 19 closed at the bottom 20 and provided with lugs 21 for enabling the entire apparatus to be fixed by screws to the support whereon it rests. Upon the top of the cylinder 19, an outwardly-projecting annular flange 22 is fixed concentrically by means of screws, whereof one is shown at 23 in Fig. 2; and upon this flange 22 rests concentrically an upright glass cylinder 24 which constitutes the wall of the upper story of the casing. The glass cylinder 24, which is of greater diameter than the metal cylinder 19, is closed at top by a metal cover 25, the flange 22 forming a closure between the cylinders 19 and 24.

A pillar 26 (omitted in Fig. 4) is fixed by screws 27 to the bottom 20 of the cylindrical base 19 and rises thence centrally through the casing to a height sufficient to allow of the yoke 16 of the upper or armature electromagnet being secured to the upper end of the pillar by means of a transverse bolt 28. The cover 25 is held in position by means of a central vertical screw 29 which passes through (and may, as indicated in Fig. 1, be sealed into) the cover and enters a threaded hole in the yoke 16. The lower or field electromagnet rests upon the bottom 20 of the casing, its yoke 30 (Figs. 1 and 2) passing through an opening in the lower part of the pillar 26 so as to be thereby locked firmly in position.

The axis 15 of each movable core 13 is constituted by a horizontal rocking-shaft journaled in bearings 31 in a bracket 32 of inverted U-shape resting upon and fixed to the yoke 16; the upper end of the core 13, which is made fast to the shaft 15 as indicated in Fig. 5, being rounded so as to be adapted to work in a correspondingly shaped recess 33 (Fig. 4) in the yoke.

In order to increase, to an adjustable extent, the magnetic force by which the pole-piece 17 of each movable core 13 is caused to recede from the adjacent stationary pole-piece 18 and is continuously held at its maximum distance therefrom during normal working conditions, there is mounted upon the flange 22, in the plane of motion of each core 13, a shoe 34 of soft iron which presents what may be termed its working face 35 directly opposite to the corresponding pole-piece 17 and just clear of the latter when the pole-piece reaches its maximum permissible distance from the adjacent pole-piece 18. Each shoe 34 is slidable upon a guide 36 whereon it is adjustable toward and from the corresponding stationary pole-piece 18, and is clamped in position by means of a screw 37, the working face 35 of the shoe being preferably shaped substantially as indicated in Fig. 4 so as to present, in the most favorable position, the largest practicable area toward the pole-piece 17 with which it coacts. It will be evident that as, under normal working conditions, the pole-pieces 18 and 17 of either couple are always of the same magnetic polarity, the opposite polarity will be induced in the adjacent end of the corresponding soft iron shoe 34, with the result that the force of magnetic repulsion with which the movable pole-piece 17 is caused to recede from the stationary pole-piece 18 will be reinforced by the force of magnetic attraction with which the same movable pole-piece is caused to approach the shoe 34, and that this reinforcement may be varied at will, as may be found desirable, by adjusting the distance of the shoe 34 from the stationary pole-piece 18.

It is preferred to utilize the movement of each core 13 for controlling an independent electric switch, the simultaneous movement of both cores 13 in either direction serving conveniently to close or open the controlled circuit, or it might be to open the one and thereafter close the other of two alternative circuits, in either case at two points simultaneously. For the latter purpose, in the construction illustrated, each rocking-shaft 15 has fast upon it a depending switch-arm 38 carrying a brush 39 which vibrates as one with the corresponding core 13 so as to establish contact with one or other of two contact-pieces 40 and 41 alternately, the two switch-arms 38 being permanently connected together in series by means of a flexible strip 42 (omitted in Figs. 3 and 5), while on the one hand those contact-pieces 40 which appertain to the one circuit are placed in position to be touched by their respective switch-brushes 39 when the pole-pieces 17 attain their maximum distance from the pole-pieces 18, and on the other hand those contact-pieces 41 which appertain to the alternative circuit are placed in position to be touched by their respective switch-brushes 39 when the pole-pieces 17 attain their minimum distance from the pole-pieces 18.

Upon the flange 22 is fixed a slab 43 of insulating material to which the several contact-pieces 40 and 41 are attached, these contact-pieces being formed of carbon blocks secured in brass holders whereof the holders for the contact-pieces 40 are shown at 44 and those for the contact-pieces 41 at 45. Each pair of contact-pieces 40, 41, present their flat contact-faces opposite to one another in substantially parallel vertical planes, the corresponding switch-brush 39 being adapted to make contact over a large area of the face of each contact-piece of the couple in turn. For this purpose the detailed construction of each switch-arm and brush is preferably as follows: Upon each rocking-shaft 15 a split clip 46 is clamped by means of screws 47, a sleeve 48 of mica or other suitable insulating material being interposed between the shaft and the clip, while the ends of the flexible conductive strip 42 are secured to the respective clips 46 by the screws 47. Each clip 46 has screwed into it, at the center of its axial length, a downwardly depending tension-rod 38 forming the switch-arm proper, the lower end of this rod being T-shaped as at 49 to receive the upper end of the switch-brush 39. The brush is formed of a rectangular piece of metal gauze (preferably silver gauze) to whose upper and lower margins are riveted sheet-metal hooks 50 and 51, the upper hook 50 being gapped so as to permit of its engaging over the T-shaped lower end 49 of the tension-rod 38. The lower hook 51 is engaged by the bow 52 of a U-shaped spring-wire strut whose side-limbs 53 extend, upward from the bow 52, in the same plane with and on opposite sides of the rod 38, the upper ends of the limbs being received in sockets in the clip 46. The limbs 53 of the spring-strut are themselves initially cambered so that, when their extremities abut against the bottom of the sockets in the clip (the hook 50 being already engaged with the T-end 49 of the tension-rod 38), the engagement of the bow 52 with the hook 51 will cause the limbs 53 to bend still farther, with the result that the gauze 39 will be stretched between the hooks 50 and 51 but will be capable of yielding slightly so as to make contact fairly over the entire contact-face of the carbon blocks 40 and 41 alternately.

The various binding-posts for the attachment of the external electric leads are fixed to the slab 43 of insulating material, and depend from beneath the flange 22 so as to be shielded from direct access of wet and adapted to throw off any water of condensation that may accumulate upon the terminals; 54 being the binding-posts for the upper or armature electromagnet, 55 those for the lower or field electromagnet, 56 the binding-posts for the contact-pieces 40, and 57 those for the contact-pieces 41.

It is obvious that, in the case of each switch, if only a single circuit be controlled, either the contact-pieces 40 or 41 may be mere stops, or dummy-contacts without electrical connections.

It will be seen from Figs. 2, 3, and 5, that both of the switches above described are placed at the same side of the vertical plane wherein the axes of the several windings 11 and 12 extend, and that space is provided within the casing for a second set of switches, similar to those above described, the switch-arms for these being mounted upon the rocking-shafts 15 at the other side of the plane just referred to, and the additional contact-pieces and other parts required being placed in corresponding positions. To facilitate such adjustment of the casing as is necessary to insure that the axis of the casing is truly vertical and the axes of the rocking-shafts 15 truly horizontal, a circular or "all round" spirit-level may be mounted within the casing in a convenient position as indicated at 58.

What I claim is:—

1. An electric relay comprising in combination, a pair of axially alined U-shaped electromagnets, the cores of one of said magnets being fixed and those of the other magnet being movable about axes transverse to the common plane of the core-axes at the respective outer ends thereof, pole pieces on the nearer ends of each pair of alined cores, and soft iron shoes adjustably disposed opposite the pole pieces of the respective movable cores in the plane of motion thereof.

2. An electric relay comprising in combination, a pair of axially alined U-shaped electromagnets, the cores of one of said magnets being fixed and those of the other magnet being movable about axes transverse to the common plane of the core-axes at the respective outer ends thereof, and pole pieces on the nearer ends of each pair of alined cores, having faces disposed in planes approximately normal to the direction of motion of the movable pole pieces.

3. An electric relay comprising in combination, a pair of axially alined U-shaped electromagnets, the cores of one of said magnets being fixed and those of the other magnet being movable about axes transverse to the common plane of the core-axes at the respective outer ends thereof, pole pieces on the nearer ends of each pair of alined cores, having faces disposed in planes approximately normal to the direction of motion of the movable pole pieces, and circuit controlling switches each movable as a unit with its respective movable core.

4. An electric relay comprising in combination, a pair of axially alined U-shaped electromagnets the cores of one magnet being fixed, rock shafts fixed to the other magnet and transverse to the plane of its axis at the outer ends of the cores thereof, pole pieces on the nearer ends of each pair of alined cores said pole pieces being normally closely adjacent and provided with opposing similar plane surfaces which are inclined to the axis of the alined cores but perpendicular to the plane of the two pair of axes, the inclination of the faces being so determined that the pole pieces of the fixed cores lie between those of the movable cores, and a circuit controlling switch fixed to each rock shaft so as to move with the movable core.

REUBEN WILLIAM TARRANT.

Witnesses:
COLIN CAMPBELL MURRAY GIBSON,
GEORGE ERNEST MINTERN.

Copies of this patent may be obtained for five cents each, by addressing the "Commissioner of Patents, Washington, D. C."